June 27, 1967 — N. G. WEITZMAN — 3,327,897
POSITIVE-FEEDING DISPENSING APPARATUS FOR A VENDING MACHINE
Filed March 11, 1966 — 4 Sheets-Sheet 1

INVENTOR.
NORMAN G. WEITZMAN

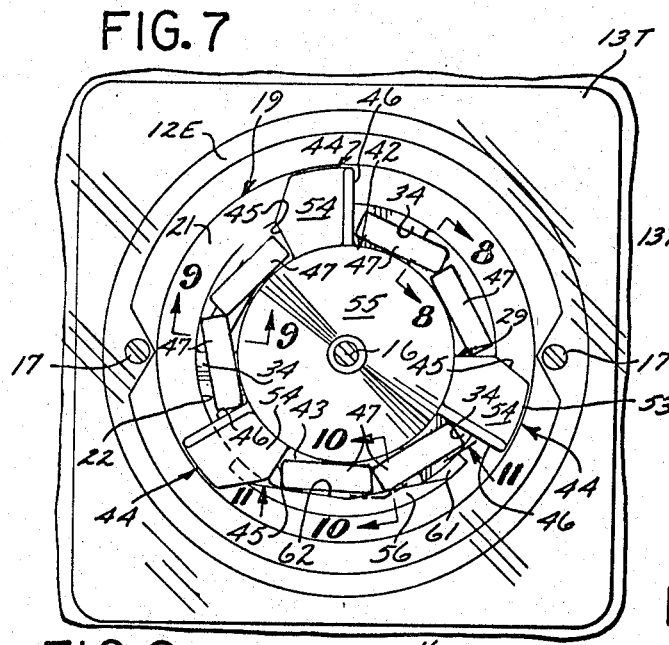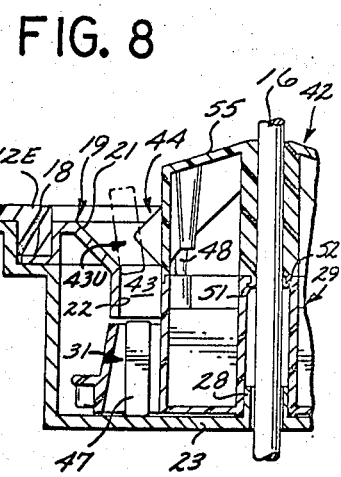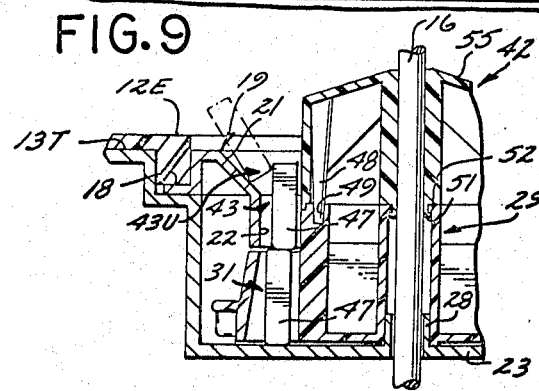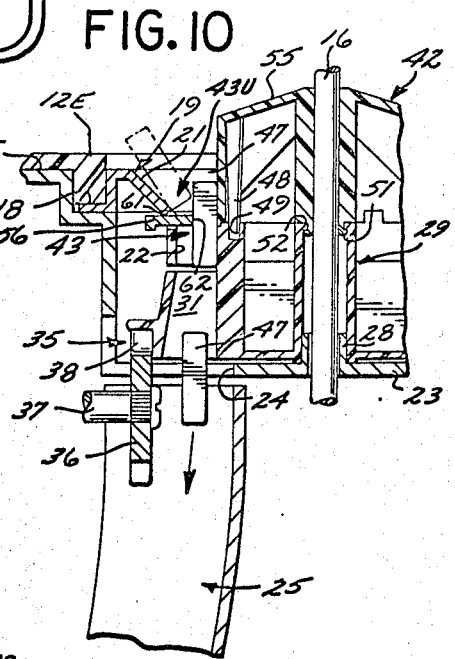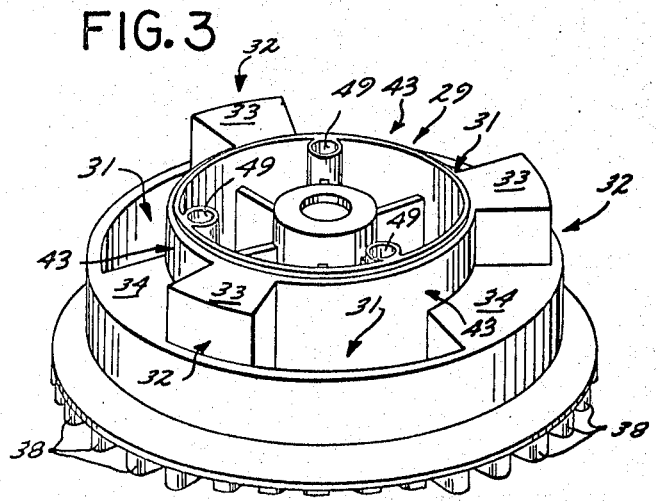

June 27, 1967  N. G. WEITZMAN  3,327,897
POSITIVE-FEEDING DISPENSING APPARATUS FOR A VENDING MACHINE
Filed March 11, 1966  4 Sheets-Sheet 3
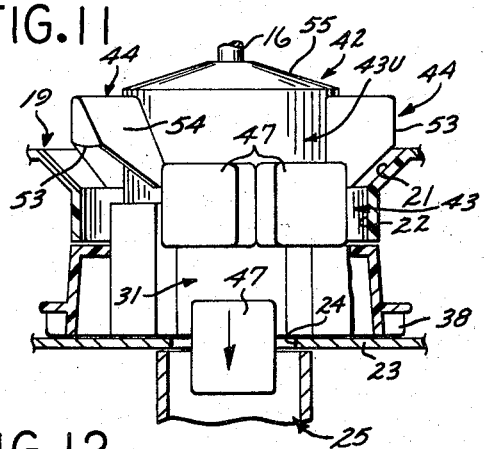
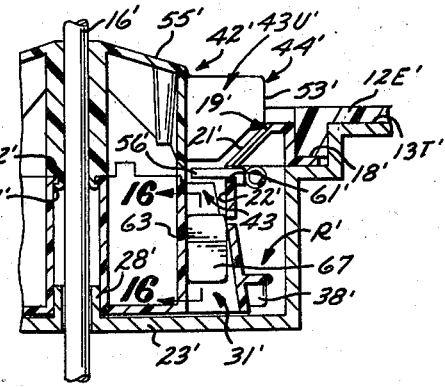
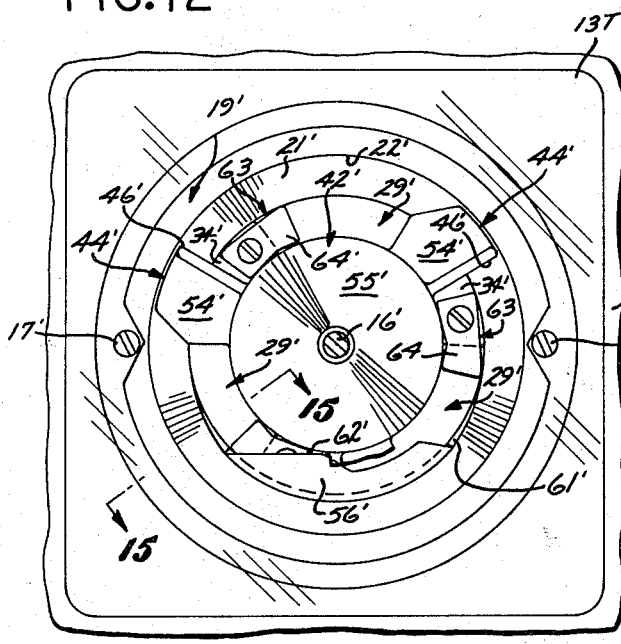
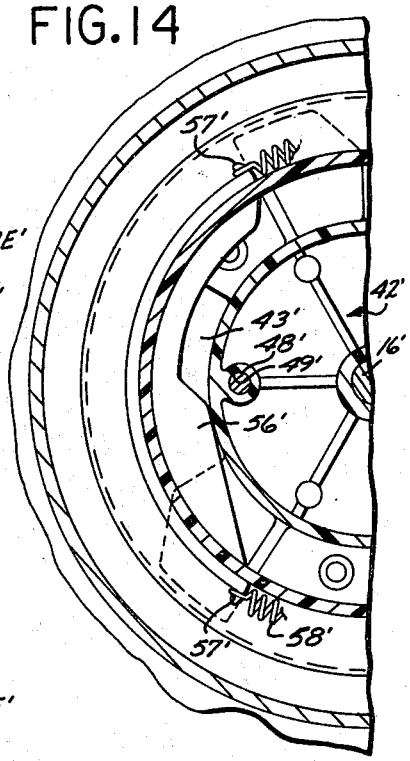
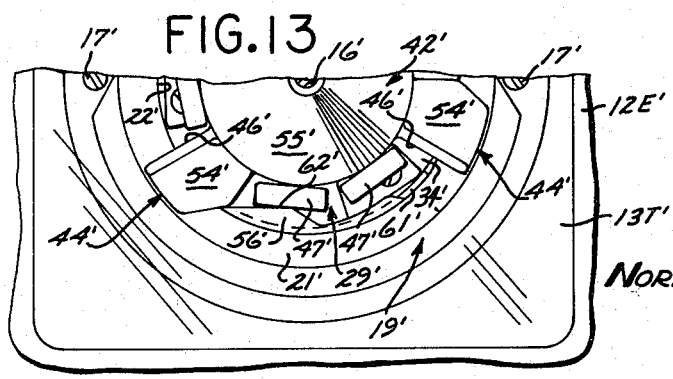
INVENTOR.
NORMAN G. WEITZMAN

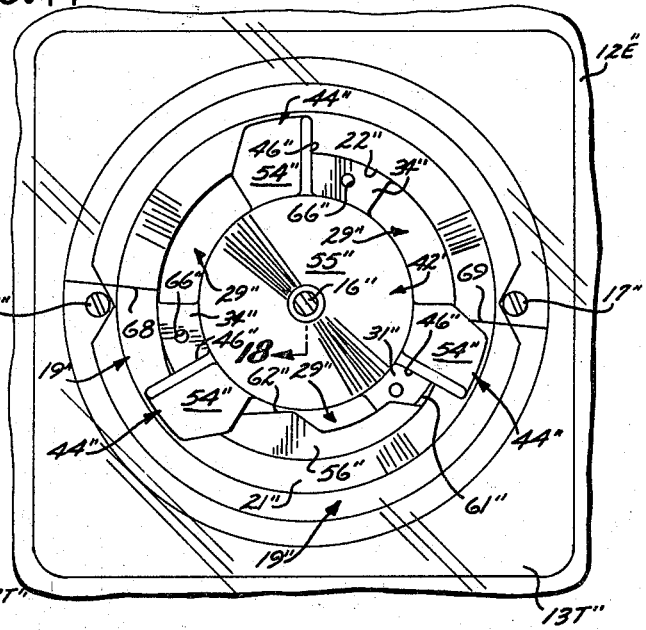

United States Patent Office 3,327,897
Patented June 27, 1967

3,327,897
POSITIVE-FEEDING DISPENSING APPARATUS
FOR A VENDING MACHINE
Norman G. Weitzman, % Arnold Provisor, Attorney-at-
Law, 16401 Knapp St., Sepulveda, Calif. 91343
Filed Mar. 11, 1966, Ser. No. 533,651
7 Claims. (Cl. 221—265)

ABSTRACT OF THE DISCLOSURE

The specification discloses dispensing apparatus for a vending machine which comprises a rotary structure having a lower apertured dispensing means and an upper apertured agitator and collector adapted to be positioned within the bottom of a merchandise receptacle and to be rotated for agitating and collecting merchandise articles, such as rectangularly shaped wrapped gum articles or the like, in a manner such that several of said merchandise articles will be gathered and stored in dispensing holes, usually with two vertically stacked rear-positioned merchandise articles positioned behind a third upper temporarily stored merchandise article so that upon successive rotations of the dispensing apparatus relative to an underlying fixed dispensing aperture, there will always be at least one merchandise article ready to be dispensed thereinto. In other words, the machine will never fail to properly vend a merchandise article because of the multiple merchandise article storage feature provided by each of the dispensing holes (usually three). The undesired dispensing of more than one merchandise article is prevented by novel locking bar means which holds the upper front-positioned merchandise article and the upper rear-positioned merchandise article when the lower rear-positioned merchandise article is directly over the underlying fixed dispensing aperture so that only the lower one of the two vertically stacked rear-positioned merchandise articles will be dispensed when in the dispensing location, while the other two will be temporarily restrained. Also, the locking bar means functions upon a succeeding rotation of the apparatus to displace rearwardly the third front-positioned upper merchandise article from its temporarily stored position into a rear position for subsequent dispensing thereof. This action of course will not occur if the agitator and collector has already collected two vertically stacked merchandise articles in the rear portion of the corresponding dispensing hole but will occur if only one merchandise article or no merchandise article is in the rear portion of the dispensing hole when the dispensing apparatus again rotates around into the dispensing location. The collector and agitator has inclined resilient stirring members or portions adapted to positively agitate the merchandise articles in the bottom of the merchandise receptacle and yet to positively prevent jamming, both because of the inclined structure thereof and because of the resilient nature thereof.

---

This invention comprises a continuation-in-part of my co-pending patent application, Ser. No. 441,669, filed Mar. 22, 1965, now Patent No. 3,298,569, issued Jan. 17, 1967, and, generally speaking, the present invention relates to the vending machine art and, more particularly, to a vending machine having a positive feeding dispensing apparatus therein for very efficiently dispensing merchandise articles (usually substantially rectangular articles, although not specifically so limited in all forms of the invention) in a manner which effectively feeds such a dispensed merchandise article in a desired dispensing relationship with respect to a dispensing chute, outlet, or substantially functional equivalent, of the vending machine and which does so in a manner which provides a positive feeding action of a nature such as to prevent incorrect feeding action of either the type where no merchandise article is dispensed when it should be, during a dispensing operation, or of the type where more merchandise articles than intended are dispensed during a dispensing operation, as has frequently occurred in prior art vending machines of one type or another.

It should also be noted that the novel positive feeding dispensing apparatus of the present invention is also of a non-jamming type adapted to virtually completely eliminate any jamming of the apparatus itself or of merchandise articles which are to be dispensed thereby, as has frequently occurred in prior art vending machines of one type or another. Indeed, in one preferred exemplary form of the invention, the positive-feeding dispensing apparatus includes a non-jamming agitator means as a portion thereof, which acts to effectively provide a positive stirring effect on the lower portion of a large group of merchandise articles carried thereabove in a merchandise receptacle of a vending machine. However, the invention is not specifically limited in all forms to the inclusion of such a positive stirring type of agitator, but in some forms may rely entirely upon the positive feeding action of the dispensing apparatus itself, which provides a certain measure of stirring of the plurality of overlying merchandise articles, and which includes a collecting and multiple article stacking and storing means adapted to bring about a positive feeding action of only one merchandise article (or other predetermined number of merchandise articles) during each dispensing operation of the vending machine.

A short discussion of the necessity of such an agitating and positive-feeding-action type of dispensing apparatus (of either of the two general forms referred to in the preceding paragraph) in a vending machine, may be in order at this point and follows in a brief form.

The first point to be noted in connection with the above is that, in the event that a merchandise or article receptacle at the top of a vending machine carries a plurality of spherical articles of merchandise to be dispensed, they effectively interact with each other in a manner which may be said to exhibit a minimal effective friction, or the functional equivalent of "viscosity" in a fluid, and, therefore, it will be found that, under the action of gravity, such articles will feed downwardly toward the dispensing apparatus of a vending machine fairly readily and, in certain cases, may not require any agitation at all in order to facilitate the article feeding action which occurs as a result of gravity.

However, in certain cases, it may be found that even such spherical articles of merchandise may become somewhat jammed so that the effect of gravity action thereon does not provide an adequate feeding action thereof to the dispensing chute of the vending machine, and, when this occurs, it is usually necessary to provide some sort of agitator for breaking up the assembly of such jammed articles and causing them to properly feed to the dispensing chute of the vending machine.

Certainly, when the articles of merchandise to be dispensed are not of the above-mentioned optium spherical shape, but are of other non-round shapes, such as the conventional parallelopiped shape of packaged "bubble gum" or the like, it is completely apparent that large quantities of such articles carried within a merchandise receptacle of a vending machine will very readily jam, and it is also further apparent that the action of gravity alone thereon certainly cannot be relied upon for proper feeding of the articles to the underlying dispensing chute of the vending machine. Therefore, when the vending machine is to dispense such non-round articles of merchandise, it becomes extremely important to provide an effective agitating means within the lower portion of the merchandise receptacle for at all times providing an effective downward feed of the merchandise articles to the dispensing chute of the vending machine. Because of this situation, such agitating and/or dispensing means for vending machines have been invented and developed heretofore.

However, it has been found that where such non-round articles are to be dispensed, there is a great likelihood that the agitator intended to provide an appropriate gravity feed of such articles to the dispensing chute of the vending machine may actually force one or more of said non-round articles into an effectively jammed relationship which, not only may prevent any further article-feeding action of the vending machine but which may actually jam the agitator and prevent any further operation thereof, thus requiring the disassembly of the vending machine in order to gain access to the interior thereof for unjamming the agitator means before it can again provide an effective agitating and dispensing action of the non-round merchandise articles.

The present invention was invented and developed to completely meet and overcome the above-mentioned prior art difficulties, and it does so substantially completely since it provides such an agitating means for facilitating the gravity feeding dispensing action of merchandise articles of virtually any shape to the dispensing portions and/or chute of a vending machine and does so in a manner which virtually completely precludes and prevents the possibility of any such jamming of the articles to be dispensed and/or of the agitating apparatus of the present invention from occurring.

The present invention, in its broadest form, includes a positive feeding dispensing apparatus adapted to be positioned at the bottom of a merchandise receptacle for a plurality of merchandise articles and adapted to be controllably rotated by driving means operated after receipt of a proper coin, or plurality of coins, by a coin-receiving apparatus of a vending machine whereby to function as a positive-stirring-action type of bottom agitator for the plurality of merchandise articles positioned thereabove for the purposes generally outlined hereinbefore, and whereby to additionally function as a collector and intermediate storage means for a small number of the merchandise articles prior to the actual dispensing of same.

In the forms of the invention illustrated hereinafter, said intermediate storage means operates or functions as a result of rotation of the dispensing means to collect three articles of merchandise of parallelopiped shape such as packaged "bubble gum," or the like, which will be referred to hereinafter as substantially rectangular merchandise articles, and it does this by effectively collecting and vertically stacking two such rectangular merchandise articles in a vertically directed dispensing orifice and opening defined within the dispensing means and by collecting a single such merchandise article forwardly thereof on a step or shoulder portion at substantially the level of the upper one of the two merchandise articles vertically stacked therebehind. This is done at a plurality of locations around the periphery or circumferential exterior of the rotary dispensing means (in the exemplary form of the invention illustrated, at three such peripheral circumferentially spaced locations around the dispensing means) so that there will always be a plurality of the merchandise articles (a total of nine in the exemplary form of the apparatus illustrated) collected by the collecting operation of the rotary dispensing means and so arranged as to allow only the bottom one of any particular pair of said vertically stacked merchandise articles to be dispensed when it is rotated into a position vertically aligned with and over an underlying dispensing aperture, which is in communication with the dispensing outlet or chute means of the complete vending machine. The apparatus is provided with locking or holding means for holding the upper merchandise article directly above the lower merchandise article so dispensed whereby to prevent said upper merchandise article from also being dispensed during any given single dispensing operation.

It should be noted that, in some cases, the total of nine merchandise articles referred to above may not all be collected and stacked and stored in the manner referred to above as a result of a single complete rotation of the dispensing means but a sufficient number will be collected, stacked, and stored to provide a positive dispensing action through the lower dispensing aperture during each dispensing operation and, after a plurality of such dispensing operations, it will be found that normally substantially the full nine merchandise articles will have been collected, stacked, and stored in the manner referred to above. Also, it should be noted that each of the three vertically directed dispensing orifices and openings referred to above may be said to comprise a lower orifice extending up to the level of the abovementioned orifice extending up to the level of the abovementioned step or shoulder portion and an opening portion positioned immediately thereabove and extending to the top level of the dispensing means and it should further be noted that each such lower dispensing orifice and opening portion positioned thereabove may be said to comprise a corresponding dispensing hole which includes both the corresponding lower dispensing orifice and overlying opening portion up to the top level of the dispensing means. Furthermore, it should be noted that, in one exemplary form of the invention, each opening portion extends arcuately forwardly from the corresponding hole into a position immediately overlying the corresponding step or shoulder portion.

Subsequently, as the dispensing means is further rotated, said locking and holding means releases the upper previously-held merchandise article and allows it to drop downwardly into a lowermost position similar to that previously occupied by the merchandise article which has just been dispensed. Of course, this only occurs after the dispensing means has been rotatably moved so said merchandise article dropping into said lowermost position is no longer over the dispensing aperture communicating with the dispensing chute of the vending machine. Thus said merchandise article will be retained in said lowermost position until the third succeeding dispensing operation of the vending machine, at which time it will again overlie said dispensing aperture of said dispensing chute of the vending machine and will then be dispensed.

However, during said succeeding three dispensing operations, said dispensing means will again function to collect an additional merchandise article overlying the lower merchandise article, or said locking and holding means will function to brush the forwardly positioned third merchandise article rearwardly into said upper vertically stacked position.

Thus it will be seen that the collecting and storage feature of the novel dispensing means functions to cause a positive and proper dispensing action to occur each time one is attempted whereas without this intermediate merchandise article storage feature, it will be found that most of the time an agitating type of dispensing apparatus will provide a proper dispensing action but that some of the time this will not occur and no article will be dispensed because the effective stirring action has not been sufficient to feed the merchandise article into the proper lowermost position for dispensing and, in some cases, it will be found at other times that more than one merchandise article may be dispensed during a single dispensing operation of the vending machine. Both of these prior art disadvantages are completely met and overcome in and through the use of the novel positive feeding dispensing apparatus of the present invention by reason of the abovementioned collecting and intermediate storage means and function of the novel apparatus of the present invention.

It should also be noted that by properly shaping and sizing the dispensing orifice and opening means at each of the three peripheral locations of the dispensing apparatus of the present invention, an arrangement can be provided such that conventional spherical or ball-type merchandise articles can be very effectively dispensed in a conventional way and this possible in addition to the fact that the apparatus of the present invention is ideally suited for dispensing oddly-shaped merchandise articles. In other words, the apparatus of the present invention provides a virtually universally adaptable vending machine capable of effectively vending a great variety of different types, sizes and/or shapes of articles.

Also, it should be noted that one preferred form of the invention may include arcuate length-modifying adapter means cooperable for attachment with respect to non-apertured portions of the dispensing means and adapted to extend downwardly adjacent thereto along at least one side of a corresponding dispensing orifice and dispensing hole partially defined thereby and within which two merchandise articles are adapted to be collected and vertically stacked, for controllably modifying the arcuate length thereof for dispensing cooperation with a different size of substantially rectangular merchandise article than that adapted to be dispensed by the apparatus prior to such length-modification of each of the three dispensing orifices of the dispensing means by three such arcuate length-modifying adapter means. In other words, the apparatus can be adapted to dispense only a single rectangular merchandise article such as a first size package of bubble gum and can then be appropriately modified for single and individually dispensing, one at a time, bubble gum in packages substantially smaller than said first size bubble gum packages. It will be understood that without this feature, it would be extremely likely that two of the small-sized bubble gum packages would be dispensed during a single dispensing operation, which is usually not desired by the owner of the vending machine.

It is a further object of the present invention to provide a positive feeding dispensing apparatus of the character referred to hereinbefore and hereinafter which can be placed in mounted operative relationship with respect to a conventional pre-existing vending machine having a standard lower vending machine base portion and mechanism portion and a standard upper mechandise receptacle adapted to be fastened thereover. In other words, the positive feeding dispensing apparatus of the present invention does not require a special vending machine for cooperation therewith and does not even require that an intervening adapter be connected between the conventional lower vending machine base portion and the conventional upper merchandise receptacle. This is quite important because if such an intervening adapter had to be positioned between the lower merchandise machine base portion and the upper merchandise receptacle, the overall height of each merchandise vending machine would be increased and this would make it virtually impossible to mount same in any of a great variety of conventional pre-existing mounting and display stands for one or more such merchandise vending machines and would make them virtually obsolete whereby to require replacement thereof at great cost.

With the above points in mind, it is an object of the present invention to provide a novel non-jamming dispensing means (and effective agitator means) for a vending machine, which effectively feeds articles of merchandise from a merchandise receptacle toward a merchandise dispensing means in a manner such as to dispense a desired amount of merchandise (usually one article at a time) for each dispensing operation and in a manner which virtually completely prevents any likelihood of jamming of the dispensing means (and effective agitating means) and/or merchandise articles.

It is a further object of the present invention to provide a non-jaming dispensing means (and effective agitating means) of the character referred to above, which acts to effectively feed and prestack articles of merchandise in predispensing relationship for subsequent individual dispensing action of the lowermost one of said prestacked articles when moved over an underlying dispensing aperture.

It is a further object of the present invention to provide apparatus of the character referred to above, in combination with a vending machine whereby to comprise a complete combination apparatus, and also to provide such a non-jamming dispensing means (and effective agitator means), per se, for cooperation with the remaining portions of such a non-specifically included vending machine—in other words, to cover the non-jamming dispensing means (and effective agitator apparatus) and associated elements, per se, as a subcombination of the complete combination form of the invention referred to above.

It is a further object of the present invention to provide apparatus having any or all of the advantages and features referred to herein, generically and/or specifically, and individually or in combination, and which is of relatively simple, inexpensive construction adapted for ready mass manufacture at relatively low cost whereby to be conducive to widespread use thereof.

Further objects are implicit in the detailed description which follows hereinafter (which is to be considered as exemplary of, but not specifically limiting, the present invention), and said objects will be apparent to persons skilled in the art after a careful study of the detailed description which follows hereinafter.

For the purpose of clarifying the nature of the present invention, several exemplary embodiments thereof are illustrated on the accompanying four sheets of drawings and are described in detail hereinafter.

FIG. 1 is a reduced-size, three-dimensional view of one exemplary type of vending machine incorporating therein one exemplary type of the novel non-jamming dispensing means and agitating apparatus of the present invention.

FIG. 2 is a larger scale three-dimensional view of the upper portion of the novel non-jamming agitating and dispensing apparatus of the present invention which is carried at the bottom of the mechandise receptacle of FIG. 1 and immediately above the lower mechanism housing portion of the vending machine. In other words, the apparatus shown in FIG. 2 comprises what might be called the non-jamming merchandise agitator and collector portion of the complete rotary structure of the non-jamming agitating and dispensing apparatus of the present invention.

FIG. 3 is a three-dimensional view similar to FIG. 2, but shows the lower (rather than the upper) portion of the non-jamming agitating and dispensing apparatus of the present invention which is carried at the bottom of the merchandise receptacle of FIG. 1 and which is fastened to, and rotates with, the upper portion thereof, which is shown separately in FIG. 2.

FIG. 4 is an enlarged view, taken substantially on the plane indicated by the arrows 4—4 of FIG. 1 immediately above the lower inwardly directed edge portion of the merchandise receptacle and with the top surface only of the underlying lower mechanism housing part of the vending machine being visible through the transparent lower edge portion of the merchandise receptacle. Additionally, this view effectively comprises a top plan view of the non-jamming agitating and dispensing apparatus of the present invention.

FIG. 7 is a view similar to FIG. 4, but comprises an operational view showing the non-jamming agitating and dispensing apparatus of FIG. 4 in an initial relationship with respect to a small number of articles of merchandise to be dispensed and which, it is understood, were carried in plural form thereabove in the merchandise receptacle most clearly shown in FIG. 1.

Figure 1:
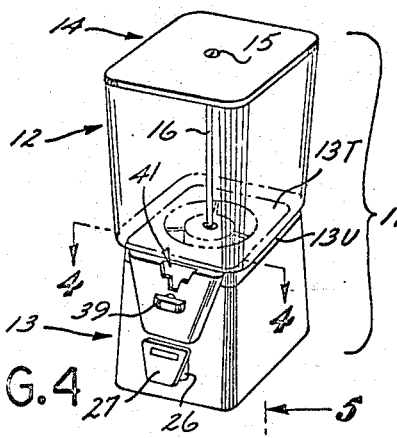

FIG. 8 is a fragmentary view, taken substantially along a plane such as that indicated by the arrows 8—8 of FIG. 7 and illustrates the fact that a single article of non-round merchandise (actually, of parallelopiped shape) has already been collected and stacked by the agitating and dispensing apparatus, and, further, shows in phantom another such merchandise article in the act of being collected and stacked above said first-mentioned merchandise article. It should be understood that when the apparatus is in this position, there might already be or might very soon be a third merchandise article, as illustrated at the plane of the section indicated by the arrows 8—8 of FIG. 7, in a position immediately arcuately in front of the second-mentioned merchandise article, which is adapted to be stacked on top of the first-mentioned merchandise article. In this view, for reasons of drawing simplification and clarity, said third merchandise article is not shown at all, although the plane of the section indicated by the arrows 8—8 of FIG. 7 passes directly through said third merchandise article, as is clearly shown in FIG. 7. This is done in order to avoid the complexity of showing the merchandise article and its packaging or cover in cross-section and in order to avoid obscuring the second merchandise article positioned therebehind.

FIG. 9 is a fragmentary view, taken substantially along a plane indicated by the arrows 9—9 of FIG. 7, and illustrates the fact that, as the agitating, collecting, mixing, and dispensing apparatus rotates in a counterclockwise direction, as viewed in FIG. 7, toward a front dispensing position, which is actually located at the bottom edge of FIG. 7, the prestacking of the merchandise articles proceeds from the showing of FIG. 8 to the showing of FIG. 9, wherein two such merchandise articles are shown prestacked in the rear portion of the corresponding one of the three vertically directed dispensing openings, and further illustrates, in phantom, the fact that another merchandise article is in the act of being collected and fed either into a position for later replacement of the upper article shown in full lines in FIG. 9 after completion of one dispensing operation or into a position behind said rear prestacked pair of said merchandise articles onto a corresponding frontally positioned step or shoulder of the rotary apparatus beyond the next wedge portion thereof. This view is similar to FIG. 8 in that the third merchandise article referred to in the description of FIG. 8 is actually adapted to be in a forward upper position of the apparatus of FIG. 9, as is clearly shown at the plane of the section indicated by the arrows 9—9 of FIG. 7. However, said third merchandise article is not shown in section and, indeed, is not shown at all in FIG. 9 for the same reasons that it is not shown in FIG. 8— that is, for reasons of drawing simplification and clarity.

FIG. 10 illustrates what happens when the apparatus and the three solid line merchandise articles of FIG. 9 rotate from the positions shown in FIG. 9 into the positions shown in FIG. 10, which effectively comprises a sectional view taken substantially on the plane indicated by the arrows 10—10 of FIG. 7, at which time the lowermost one of the merchandise articles of FIG. 9 moves over a lower dispensing aperture in the bottom transverse plate so that said bottom merchandise article of FIGS. 9 and 10 can drop downwardly therethrough into the conventional dispensing chute means of the merchandise vending machine, as is shown in the act of occurring in FIG. 10. At this time, the upper rear merchandise article of both FIGS. 9 and 10 is locked and held so as to prevent it from also being dispensed in the same manner as the lower merchandise article, by the operation of the spring biased locking bar means which moves inwardly thereagainst and locks the upper merchandise article until it is moved out of vertical alignment with the lower dispensing aperture in the bottom transverse wall. This view is similar to FIGS. 8 and 9 in that the third merchandise article referred to in the description of FIGS. 8 and 9 is actually adapted to be in a forward upper position of the apparatus of FIG. 10, as is clearly shown at the plane of the section indicated by the arrows 10—10 of FIG. 7. However, said third merchandise article is not shown in section and, indeed, is not shown at all in FIG. 10 for the same reasons that it is not shown in FIGS. 8 or 9—that is, for reasons of drawing simplification and clarity.

FIG. 11 is a fragmentary, partially-broken-away view taken on a plane immediately to the left of the vertically positioned merchandise articles of FIG. 10, substantially along the plane indicated by the arrows 11—11 of FIG. 7, with all portions of the apparatus in front of said plane and with certain other portions of the apparatus being removed for reasons of drawing simplification and clarity. This view is primarily for the purpose of illustrating the three collected articles of merchandise adapted to be collected by the collecting function of the novel dispensing means of the present invention at each of three locations around the periphery thereof as a result of multiple rotations of the dispensing means below a plurality of the merchandise articles adapted to be carried in the merchandise receptacle of FIG. 1. This view illustrates the bottom one of the vertically-stacked pair of merchandise articles in the act of being dispensed downwardly through the dispensing aperture into the upper end of the dispensing chute means. The upper two merchandise articles of FIG. 11 are held by the locking bar of FIG. 10 (which is not shown in FIG. 11) so that only the lower single article of merchandise can be dispensed during a given single dispensing operation.

Figure 4:
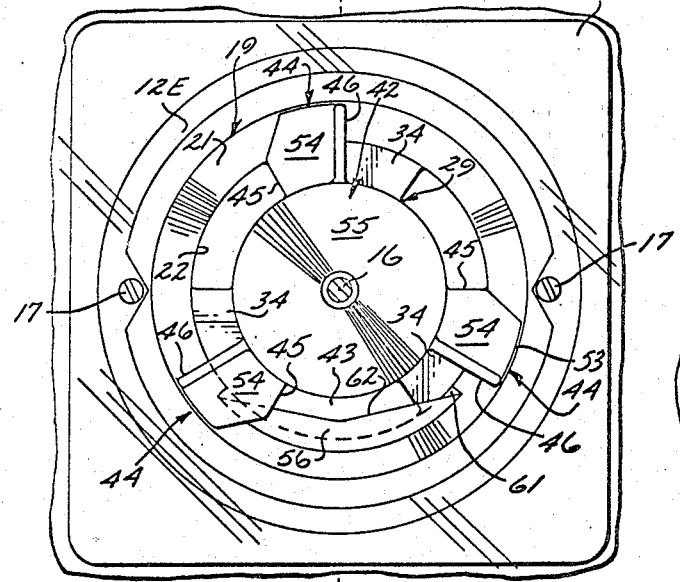

FIG. 12 is a view generally similar to FIG. 4, but with the agitator and dispenser rotated in a counterclockwise direction somewhat less than 90 degrees and with a portion of one of the agitator vanes which overlies the spring-biased locking bar being broken away for reasons of drawing clarity. This view illustrates a very slightly modified form of the invention having a slightly differently shaped locking bar and also having three arcuate length-modifying adapter attachment means for modifying the dispensing means for single-item dispensing operation with smaller merchandise articles than those shown in the first form of the invention—such smaller merchandise articles being illustrated in FIG. 13.

FIG. 13 is a fragmentary view of a portion of the apparatus of FIG. 12 after the dispensing means has been rotated sufficiently to have collected three merchandise articles at each of the three peripheral locations of the dispensing means adapted for this purpose. In other words, this view is similar to a corresponding portion of FIG. 7, but is of the FIG. 12 form of the invention.

Figure 6:
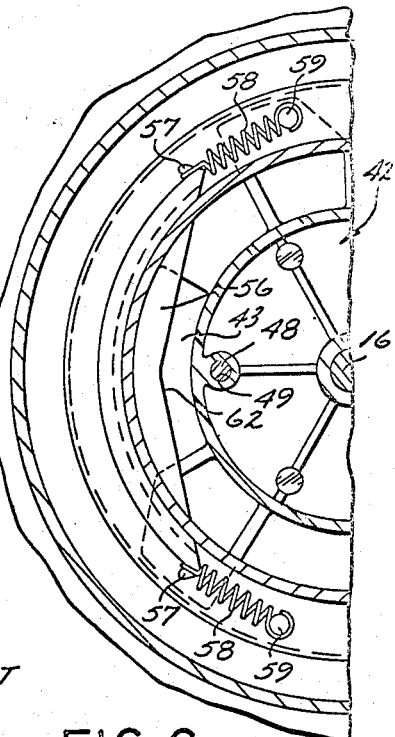
FIG. 6 is an even larger scale bottom plan view, taken substantially on the plane indicated by the arrows 6—6 of FIG. 5 and shows part of the overlying portions of the apparatus in cross section and shows part of the overlying portions of the apparatus above the plane of said section 6—6 in full bottom plan view elevation rather than in cross section.

FIG. 14 is a view similar to FIG. 6 but is of the modified form of the invention of FIGS. 12 and 13.

FIG. 15 is a view taken substantially along the plane indicated by the arrows 15—15 of FIG. 12 and is primarily for the purpose of showing one of the mounted arcuate length-modifying adapter attachment means in end elevation.

FIG. 16 is a fragmentary view taken substantially along the plane indicated by the arrows 16—16 of FIG. 15.

FIG. 17 is a top plan view generally similar to FIG. 12 (with the agitator rotated from its FIG. 12 position), but illustrates a further modified form of the invention wherein the agitator means (generally similar to that shown individually at FIG. 2 in the first form of the invention) and the dispensing means (generally similar to that shown individually in FIG. 3 of the first form of the invention) are effectively integral with respect to each other and comprise a single structure adapted to be mounted with respect to the vending machine by reason of the provision of a split or separable outer ring.

FIG. 18 is a fragmentary cross-sectional view taken substantially along the plane indicated by the arrows 18—18 of FIG. 17.

FIG. 19 is a bottom view taken substantially along the plane indicated by the arrows 19—19 of FIG. 18 and is similar in many respects to FIG. 14 illustrating the second form of the invention.

FIG. 20 is a fragmentary top plan view generally similar to a correspondingly-positioned fragmentary portion of the second form of the invention, as illustrated in FIG. 12, and is for the purpose of illustrating a modified type of resilient agitator projection.

FIG. 21 is a fragmentary sectional view taken substantially along the plane indicated by the arrows 21—21 of FIG. 20.

Generally speaking, the novel non-jamming agitating and dispensing apparatus of the present invention is adapted to be mounted in any of several different types of vending machines, one exemplary type of which is generally designated at 11 in FIG. 1 and which includes an upper transparent merchandise receptacle, indicated generally at 12, and a lower mechanism housing portion, indicated generally at 13, which houses most of the interior mechanism of the vending machine including the coin receiving means, the merchandise dispensing chute means, and various other conventional elements.

It will be noted that the merchandise receptacle 12 has a top closure cover 14 which is normally controllably removably fastened by a key-operated lock member 15 to the upper end of a centrally positioned vertical tie rod 16, which passes through a central aperture in a central upstanding boss 28 on the transverse wall 23, and which is rigidly threadedly fastened to a lower or bottom wall portion carried at the bottom of the lower mechanism housing portion 13 of the vending machine 11, thus firmly but controllably disengageably vertically fastening together all portions of the vending machine 11.

In certain instances, a lower inwardly directed edge portion 12E of the merchandise receptacle 12 is fastened by downwardly directed fastening screw means 17 to an underlying top wall portion 13T of the lower vending machine mechanism housing 13 (usually with intervening compressible gasket means positioned therebetween for sealing and vibration minimizing purposes) with an outer circular edge portion 18 of an opening-defining ring means, generally designated at 19, being also firmly fastened by said fastening screws 17 and having an inwardly centrally downwardly inclined conical portion 21 terminating in an annular, downwardly directed portion 22 which effectively defines a substantially cylindrical, centrally positioned, downwardly directed opening through the complete opening-defining ring means 19. In the example illustrated, said ring means 19 is made of molded polypropylene plastic material which is particularly advantageous because of its elastic and wear-resistant qualities. However, it may be made of various other suitable materials.

In the exemplary form illustrated, the upper portion 13U of the mechanism carrying housing 13 may be said to effectively have a substantially centrally located downwardly directed recess provided with a substantially transverse bottom wall; said downwardly directed recess being generally indicated at R and said substantially transverse bottom wall being indicated at 23.

It will be noted that the above-mentioned bottom wall 23 has a frontally positioned dispensing aperture 24 in effective communication with the upper end of an underlying dispensing chute means 25 which is of a conventional type as found in conventional vending machines and which terminates in a lower merchandise receiving cup or recess 26 normally covered by a hinged closure door 27 and which can be controllably opened to remove a merchandise article which has been dispensed through the dispensing aperture 24 and downwardly through the dispensing chute means 25 in a manner which will be described hereinafter.

It will be noted that, in the exemplary form illustrated, the above-mentioned transverse bottom wall 23 is effectively provided with the previously mentioned upwardly directed bearing or boss means 28 on the upper surface thereof and substantially centrally located thereon and adapted to rotatably receive thereon a substantially circular dispensing means, generally designated at 29, for rotation around the vertical axis of said boss 28 and also the vertical axis of the previously mentioned centrally positioned tie rod 16.

It should be noted that said dispensing means, indicated generally at 29 and best shown in FIG. 3, has a plurality (actually, three in the example illustrated) of substantially vertically directed dispensing orifices 31 therein, circularly or circumferentially spaced from each other and provided with intervening (non-apertured) portions, such as generally designated at 32, which include upper closed top hollow portions 33 frontally positioned with respect to each of said three intervening portions generally designated at 32 (frontally meaning in the direction of rotation of the complete lower dispensing means 29) and which also include rear stepped lower hollow portions 34 positioned immediately behind each of the upper portions 33 of each of said three circumferentially spaced intervening portions, generally indicated at 32, of said lower dispensing means, generally designated at 29.

It should be noted that, for purposes of making clear the language used in this application, I have arbitrarily used different terms for the various openings, holes, or apertures through which the merchandise articles are dispensed. It should be understood that these designations are entirely arbitrary and are used merely for clarity and are not to be construed as limiting the invention. In order to clarify said terms, it should be noted that there is only one dispensing aperture, which is designated by the reference numeral 24. However, there are three dispensing orifices, each of which is designated by the reference numeral 31 and which extends vertically through the dispensing means 29 from the bottom to the top thereof and which terminates at the level of the lower stepped shoulder portion 34. This can be best understood by a careful examination of FIG. 3. Immediately overlying each of said three dispensing orifices 31 is a corresponding opening portion, such as is best indicated at 43 in FIG. 3, and it should be understood that each of said opening portions 43 lies directly above the corresponding dispensing orifice 31 and extends from the horizontal level of the lower stepped portion 34 upwardly to the horizontal level of the upper stepped portion 33 and extends arcuately horizontally the complete distance between adjacent upper stepped portions 33, as can be best understood by a careful examination of FIG. 3. It should further be understood that such vertically superimposed lower dispensing orifice 31 and overlying opening portion 43 together comprise what I term a dispensing hole which, therefore, extends from the bottom of the dispensing means 29 through the lower dispensing orifice 31 and through the opening portion 43 lying thereover up to the horizontal level of the upper stepped portion 33 in the case of each of the three dispensing holes.

Figure 5:
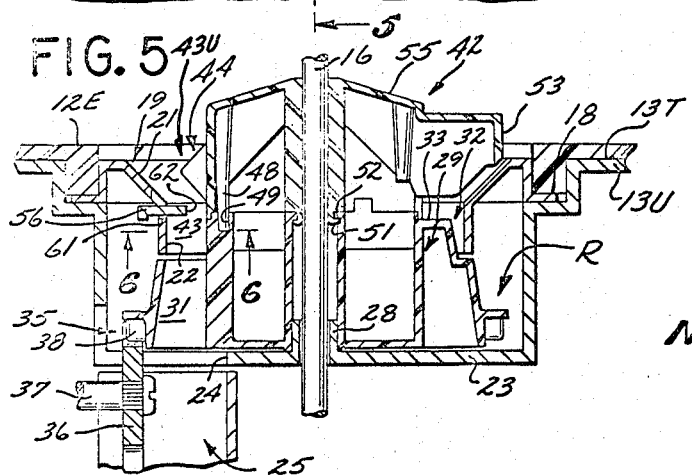
FIG. 5 is a fragmentary, partially broken away, sectional view, taken substantially on the plane indicated by the arrows 5—5 of FIG. 4. However, certain elements lying on said plane are shown partly in elevation and partly in section rather than in full section.

It should also be noted that driving means is provided for rotating said dispensing means, generally designated at 29, in a counterclockwise direction as viewed in FIGS. 4 and 7, and in a clockwise direction as viewed in FIG. 6. In the exemplary form illustrated, said driving means is generally designated at 35 and is best shown in FIG. 5, wherein it comprises a spur gear 36 carried by a manually rotatable shaft 37; said spur gear 36 being in engagement with a ring gear 38 circumferentially carried around the lower bottom edge of said previously mentioned lower dispensing means generally designated at 29 for rotating same in a counterclockwise direction as viewed in FIGS. 4 and 7 and in a clockwise direction as viewed in FIG. 6 whenever said shaft 37 is rotated in a clockwise direction by an operating handle 39, carried at the front of the vending machine 11 as shown in FIG. 1. This driving rotation is of limited and predetermined extent under the control of the coin-receiving mechanism, generally designated at 41 in FIG. 1, since said coin-receiving mechanism 41 only allows the handle 39 to be rotated such a predetermined distance, upon receipt of the proper coin or plurality of coins, for one dispensing operation of the vending machine 11. This predetermined extent of rotation of the handle 39 is such as to rotate the lower dispensing means, generally designated at 29, 120 degrees upon each rotary operation of the handle 39, thus placing each of the three previously mentioned dispensing orifices 31 successively in superimposed aligned relationship with respect to the previously mentioned underlying dispensing aperture 24. In each case, this will resemble the showing of FIG. 5 and will result in a dispensing operation.

Figure 2:
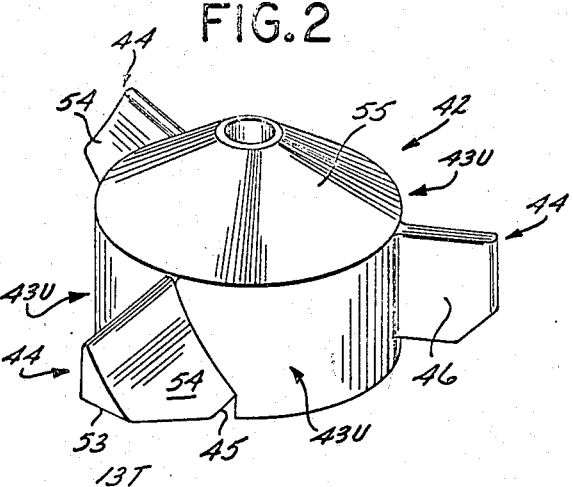

The novel apparatus of the present invention also includes a non-jamming merchandise agitator and collector, such as is generally designated by the reference numeral 42, and as is perhaps best shown in FIG. 2, which is mounted in superimposed rigid relationship with respect to the previously mentioned lower dispensing means, generally designated at 29, so as to be rotatably movable therewith upon each rotary operation of the handle 39, as permitted by the coin-receiving mechanism 41 of the vending machine.

It will be noted that said non-jamming merchandise agitator and collector means 42 has, when effectively mounted within the previously mentioned ring means 19, a plurality of vertically directed openings 43U therein circularly or circumferentially spaced apart and defined by separating non-apertured portions, such as generally designated at 44, and as perhaps best shown in FIG. 2.

It will be noted that, in the example illustrated, there are three such vertically directed dispensing openings 43U positioned similarly and in superimposed relationship with respect to the previously mentioned three dispensing orifices 31 in the lower dispensing means generally designated at 29 and the previously mentioned corresponding opening portions 43 overlying said orifices 31, respectively. However, it should be noted that while the front edge, such as shown at 45, of each of said separating portions 44 of the agitator and collector means 42, is adapted to be vertically aligned with the rear edge of each of said lower dispensing orifices 31, such is not true with respect to the rear edge, such as indicated at 46 of each of said separating portions 44 of said agitator and collector means 42. In other words, each of said rear edges 46 is not vertically aligned with the front edge of the corresponding lower dispensing orifice 31, but is positioned forwardly thereof and, in fact, is actually aligned with the rear edge of each of the stepped upper portions 33 of the intervening portions 32 of said lower dispensing means, designated generally at 29.

Thus, it may be said that each of the three dispensing openings 43U defined between the separating portions 44 of the upper agitator and collector means 42, and each corresponding one of the previously mentioned corresponding opening portions 43 overlying said orifices 31, respectively, is arcuately longer and extends forwardly to a greater extent than the corresponding underlying orifice 31 of the lower dispensing means generally designated at 29. It should be noted that each of the three dispensing openings 43U is coextensive in arcuate length with, and immediately overlies and comprises an upper extension of, the corresponding opening portion 43 defined between the adjacent upper stepped shoulder portions 32 (having upper surfaces 33) of the dispensing means 29, and throughout this application, each vertically adjacent pair of said displacing openings 43U, and immediately underlying portion 43, will be referred to, and will be considered to effectively comprise in each case, a single such dispensing opening since they are in direct vertical communication and functionally receive corresponding upper and lower portions of the two upper merchadise articles of each group of three collected and stored at each of the hereinbefore mentioned three circumferentially-spaced locations of the dispensing means and the agitator and collector means carried thereover. This is to make it possible for the non-round articles of merchandise 47 to either drop into any of the deep holes or openings defined by vertically aligned upper dispensing openings 43U, the underlying dispensing opening portions 43, and lower dispensing orifices 31 (the depth of each of the three such deep openings being such as to allow two such articles of merchandise 47 to be vertically received in stacked relationship therein) or to allow only a single article of merchandise 47 to be received within the upper dispensing opening 43U, and the underlying part of the opening portion 43, in a manner such as to rest upon the lower stepped shoulder portion 34 of the corresponding one of the three intervening portions generally designated at 32 of the lower dispensing means generally designated at 29. Actually, normally both of these actions will occur—that is, two vertically stacked articles of merchandise 47 will lie in each of the deep holes defined by corresponding vertically aligned upper dispensing openings 43U, the corresponding intermediate dispensing opening portions 43, and lower dispensing orifices 31 while, at the same time, a single article of merchandise 47 will be received within the corresponding front portion of the upper dispensing opening 43U, and the underlying part of the opening portion 43, in a manner such as rest upon the corresponding lower stepped shoulder portion 34 forwardly of the two vertically stacked merchandise articles 47 positioned immediately therebehind. This occurs immediately behind each of the three intervening portions, generally designated at 32, of the dispensing means 29. This facilitates collecting, prestacking, and final appropriate dispensing of the merchandise articles 47.

It will be noted that the upper agitator and collector 42 is effectively fastened with respect to the lower dispensing means 29 by a plurality of locating pins 48 which are adapted to be received in corresponding recesses 49. This prevents any relative rotation occurring between said upper agitator and collector 42 and said lower dispensing means 29. Additionally, they are firmly fastened together by a peened over retaining lip 51 which is peened or formed into the retaining relationship with respect to the shoulder 52 clearly shown in FIG. 5 at the time that said upper agitator and collector 42 is assembled with respect to said lower dispensing means 29. It should be noted that the elements 51 and 52 may be said to comprise common vertical fastener or fastening means of one exemplary type. However, it should be noted that various other types of fastening means may be employed and, in certain cases, the two structures may be of integral or unitary construction.

It should be noted that the separating portions, generally designated at 44, of the upper agitator and collector 42, each effectively comprises an inclined wedge member having a base portion 53 at the bottom thereof, the substantially vertically upstanding rear wall portion 46 thereof, and an inclined front portion 54 thereof which is downwardly divergingly inclined with respect to the upstanding rear portion 46 thereof and downwardly forwardly inclined in the previously mentioned direction of rotation thereof in the vending machine 11, which comprises a counterclockwise direction of rotation, as viewed in FIGS. 4 and 7, and a clockwise direction of rotation thereof as viewed in FIG. 6.

It should be noted that the top of the agitator and collector 42 has an upwardly conically converging surface 55, and this, together with the forwardly downwardly inclined wedge shaped separating portions 44 thereof, are of a configuration such as to allow same to rotate freely within a plurality of the non-round articles 47 which are to be dispensed and which are normally carried in the merchandise receptacle 12, in a completely non-jamming manner. In other words, any time any slight tendency to jamming even develops, it will be noted that the merchandise article will merely rise up and over the inclined front face 54 of the corresponding wedge shaped separating portion 44, and no such jamming will develop. This is further facilitated by reason of the fact that the complete agitator and collector, generally designated at 42, is preferably made of a resilient material, such as molded polypropylene plastic, for example, although various other suitable materials may be employed in lieu thereof.

It should be noted that the previously mentioned ring means 19 is provided with a spring biased locking bar means 56 which is of curved arcuate shape and which has fastened to opposite hook portions 57 thereof tension spring means, such as indicated at 58, which may extend completely around the exterior of the wall portion 22 of said ring means 19 or which may extend only a short distance in each case and be fastened to fastening means 59, as is most clearly indicated in FIG. 6. The locking bar means 56 is mounted in a slot 61 which extends through an arcuate front portion of said wall 22 of said ring means 19 overlying the previously mentioned lower dispensing aperture 24 in the transverse bottom wall 23 of the recess R, and the arrangement is such that whenever a pair of vertically superimposed merchandise articles 47 are rotated into the front dispensing position overlying said lower dispensing aperture 24, such as is clearly shown in FIG. 10, the upper one of said merchandise articles 47 is firmly held and locked by said locking bar means 56 in a manner which will prevent it from being dispensed. However, the lower merchandise article 47 is allowed to be dispensed by falling downwardly through the dispensing orifice 31 and the underlying dispensing aperture 24 into the dispensing chute 25. It will also be noted that the curved inner arcuate edge 62 of said locking bar 56 is such as to allow relative rotary movement of the locked merchandise article 47 with respect thereto so that the complete rotary assembly can be rotated from the locked position shown in FIG. 10 into the next counterclockwise position beyond the lower dispensing aperture 24, such as shown in FIG. 8, during which rotating movement the locking bar means 56 will effectively release the upper merchandise article 47 from its previously locked engagement therewith. Normally there will also be a third forwardly positioned merchandise article 47 abutted by the locking bar means 56 at substantially the same time that the rear-positioned upper merchandise article 47 is abutted and held thereby. This is so because each collecting region behind each agitator vane 44 and each intervening portion 32 normally has collected three articles of merchandise, two in vertically stacked relationship in the deep hole or opening defined by the corresponding vertically aligned upper dispensing opening 43U, the corresponding intermediate opening portion 43, and lower dispensing orifice 31, and a third merchandise article positioned in the forward portion of the corresponding dispensing opening 43U, and the underlying part of the opening portion 43, resting on the corresponding lower stepped shoulder portion 34. However, said forward merchandise article 47 does not in any way interfere with the operation of the locking bar 56 and is not affected thereby until its second time around when it again reaches the front dispensing location position illustrated in FIGS. 10 and 11 where said third article of merchandise is adapted to be brushed arcuately rearwardly by said locking bar 56 into a position at the top of the corresponding vertically aligned dispensing opening portion 43 and lower dispensing orifice 31 (both of which overlie the dispensing aperture 24).

As the rotary assembly, comprising the upper agitator and collector 42 and the lower dispensing means 29, rotates successively 120 degrees through each of the three succeeding positions, it will be noted that the upper agitator and collector 42 acts in a completely non-jamming manner to collect, feed, and prestack the articles of merchandise 47 so as to normally have a rear pair thereof stacked in a manner such as clearly indicated in FIG. 9 and so as to normally have a single merchandise article 47 positioned in front of said rear pair of vertically stacked merchandise articles 47 on the lower stepped shoulder 34 of the dispensing means 29, for repetition of the dispensing operation with respect to the lower article 47 and the temporary locking operation with respect to the upper merchandise article 47 shown in FIG. 10 and previously described.

It should be noted that each of the three dispensing orifices 31 (and the directly vertically overlying portion of the corresponding dispensing opening 43) is of an arcuate length (in the counterclockwise direction of rotation of the dispensing means 29 and the agitator means 42) slightly greater than the length of any one of the substantially rectangular merchandise articles 47 which are to be dispensed and less than the width of two such merchandise articles 47. This positively prevents two merchandise articles 47 from being dispensed during a single dispensing operation. It should also be noted that each of said three dispensing orifices 31 (and the immediately directly vertically overlying portion of the corresponding dispensing opening 43) have a combined vertical depth substantially greater than the length of any of the merchandise articles 47 whereby to be capable of receiving and vertically stacking two such merchandise articles 47 in vertically superimposed relationship therein. It should also be noted that the forward portion of each of said dispensing openings 43, positioned immediately above the plane of the partially underlying corresponding stepped non-apertured intervening portion 34 of the dispensing means 29, is of an arcuate length greater than the length of any merchandise article 47 so as to be adapted to receive a third one of said merchandise articles 47 positioned therein in a location forward of the upper one of the two rear-positioned vertically stacked merchandise articles 47 received within the vertically aligned and superimposed dispensing orifice 31 and rear portion of the dispensing opening 43U and the lower dispensing opening portion 43.

FIGS. 12–16 inclusive illustrate a slight modification of the invention, and parts corresponding to those of the first form of the invention ilustrated in FIGS. 1–11 inclusive and described in detail hereinbefore are designated by similar reference numerals, singly primed, however.

It will be noted that, in the modification of FIGS. 12–16, the major difference from the first form of the invention comprises the fact that the locking bar 56′ is differently shaped and functions slightly differently from the locking bar 56 of the first form of the invention and each of the lower stepped shoulder portions 34′ of the dispensing means 29′ is additionally controllably removably and/or adjustably provided with an arcuate length-modifying adapter attachment means, each generally designated by the reference numeral 63, which is cooperable for removable attachment to the corresponding stepped shoulder portion 34′ of the corresponding intervening non-apertured portion 32′ of said dispensing means 29′ along the front edge of the corresponding dispensing orifice 31′ for controllably modifying the arcuate length thereof whereby to be suitable for dispensing cooperation with a different size of substantially rectangular merchandise article than that adapted to be dispensed by the apparatus prior to such length-modification of said dispensing orifices 31′ by said arcuate length-modifying adapter attachment means 63.

Several such modified substantially rectangular merchandise articles are shown in FIG. 13 and are designated by the reference numeral 47′, and it will be noted that, in the example illustrated, they are smaller in size than the merchandise articles 47 adapted to be dispensed by the apparatus prior to the mounting of said length-modifying adapter attachment means 63. In other words, the modified merchandise articles 47′ are smaller than the mechandise articles 47 illustrated in FIGS. 7–11 inclusive of the first form of the invention, which would be capable of being properly dispensed by the modified form of the invention illustrated in FIGS. 12–16 inclusive prior to the mounting of the arcuate length-modifying adapter attachment means 63.

In the example illustrated in FIGS. 12–16 inclusive, each of said arcuate length-modifying adapter attachment means 63 is of generally L-shaped configuration having a flat horizontal upper portion 64 adapted to be fastened by a self-tapping screw 65, or the like, engaging a hole 66 cast in the surface of the stepped portion 34′ of the dispensing means 29′ at each of the three 120-degree spaced locations clearly shown in FIG. 12. The flat upper portion 64 of each of said adapter attachment means 63 is provided with a downwardly extending portion 67 which is positioned in the corresponding dispensing orifice 31′ in a manner such as to effectively shorten the useful arcuate length thereof, as is most clearly shown in FIG. 16, so as to be longer than the maximum dimension of the modified mechandise article 47′ by less than twice the minimum dimension thereof whereby to prevent the inadvertent dispensing of two merchandise articles 47′ during a single dispensing operation. The downwardly directed member 67 may be provided with a rear reinforcing rib 68 for strengthening and/or supporting purposes, if desired.

FIGS. 17–19 inclusive illustrate a further slight modification of the invention, and parts corresponding to those of earlier forms of the invention illustrated in FIGS. 1–11, or FIGS. 12–16, and described in detail hereinbefore are designated by similar reference numerals, doubly primed, however. In this modification, the opening-defining ring means, generally designated at 19″, is split, as indicated at 68 and 69, to allow it to be assembled around the combination agitator means 42″ and dispenser means 29″, which are of integral unitary molded plastic construction. In other words, in this modification of the invention, the rotary structure of the apparatus need not comprise a separate upper agitator (such as that shown at 42 in FIG. 2 of the first form of the invention) and a separate lower dispensing means (such as that shown at 29 in FIG. 3 of the first form of the invention), which are then fastened together to function as a unit (such as by the fastening means indicated at 48 in the first form of the invention).

In the modification of FIGS. 17–19 inclusive, both said agitator 42″ and said dispensing means 29″ are integrally formed. Therefore, the splitting of the mounting ring 19″ as indicated at 68 and 69 facilitates the mounting of the entire dispensing apparatus in a vending machine generally similar to that shown in FIG. 1 and generally designated by the reference numeral 11 in FIG. 1.

It will be noted that the fastening screws 17″ of this modification of the invention effectively fasten opposite half portions of the split ring 19″ with respect to the underlying metal top 13T″ of the vending machine base portion so that the entire structure is rigidly and firmly mounted despite the splitting of the ring 19″ at 68 and 69. Otherwise this modification of the invention is very similar to the second form of the invention illustrated in FIGS. 12–16 inclusive, and no further detailed description is thought necessary.

FIGS. 20 and 21 fragmentarily illustrate a further slight modification of the invention, and parts corresponding to those of earlier forms of the invention illustrated in FIGS. 1–11, FIGS. 12–16, or FIGS. 17–19, and described in detail hereinbefore, are designated by similar reference numerals, triply primed, however.

The major difference of this modification of the invention is the fact that the means carried by the agitator 42‴ for providing a positive agitation and stirring action to overlying merchandise articles is modified from the wedge-shaped structures shown at 44 in FIG. 2 of the first form of the invention to comprise resilient deflectable stirring members, one of which is generally designated at 44‴ in FIGS. 20 and 21 and which, in said modification, takes the form of a coil spring 70 having a free upper end 71 and a bottom end 72 adapted to be firmly fastened to the corresponding portion 33‴ of the dispensing means generally designated at 29‴.

Said plurality of resilient spring members 44‴, together with the upstanding central hub portion 55‴, effectively comprise a modified type of agitator means generally designated by the reference numberal 42‴, which is functionally capable of providing the desired type of non-jamming bottom rotary stirring action to a plurality of overlying merchandise articles—particularly non-round merchandise articles such as the substantially rectangular merchandise articles illustrated in the earlier figures of the drawing at 47 and 47′. Otherwise this modification of the invention is most similar to that illustrated in FIGS. 17–19 and has a composite integral or unitary agitator means 42‴ and dispensing means 29‴ of the same type illustrated in FIGS. 17–19 and described in detail hereinbefore. However, the modified type of stirring member 44‴ may be employed in any of the various forms of the invention and, further, it should be noted that in certain forms of the invention, such an upwardly projecting resilient stirring member similar to that shown at 44 in FIG. 2 and shown at 44‴ in FIGS. 20 and 21 may be eliminated entirely and a somewhat lesser stirring action of the dispensing means 29 or 29‴ may be relied upon for the above-described merchandise article bottom stirring action.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A non-jamming positive feeding action agitating and dispensing apparatus for a vending machine, comprising: a housing having a downwardly directed recess provided with a bottom wall portion, said bottom wall portion including a dispensing aperture adapted to be in effective communication with a dispensing outlet means of a conventional merchandise vending machine, dispensing means located in said recess in rotatably mounted relationship with respect to said bottom wall portion, said dispensing means having a plurality of substantially vertically directed dispensing holes therein circularly spaced from each other and provided with intervening non-apertured portions, driving means for rotating said dispensing means to bring said dispensing holes into successive communication with said dispensing aperture, each of said dispensing holes being of an arcuate length slightly greater than the length of a merchandise article which is to be dispensed and less than the width of two such merchandise articles, each of said dispensing holes being of a vertical depth substantially greater than the length of a merchandise article which is to be dispensed, whereby to receive and vertically stack two such merchandise articles in vertically superimposed relationship with at least the lower one of said two such merchandise articles therein and with the upper one of said two such merchandise articles at least partially therein, said intervening non-apertured portions of said dispensing means being horizontally stepped and each having a front upper portion and a rear lower portion positioned immediately behind said front upper portion of said dispensing means and lying at a level substantially lower than said front upper portion of said dispensing means and defining a storage recess of a size capable of receiving one merchandise article thereon in a position forward of the upper one of two vertically stacked merchandise articles received within the corresponding dispensing hole positioned arcuately rearwardly adjacent thereto; and spring-biased locking bar means normally spring-biased inwardly into a position extending into one of said dispensing holes where it is vertically superimposed over said dispensing aperture in said bottom wall portion for temporarily immobilizing and holding an upper one of two vertically stacked merchandise articles received within said dispensing hole while allowing the lower positioned merchandise article to be freely dispensed through the aligned lower positioned dispensing aperture.

2. A non-jamming positive feeding action agitating and dispensing apparatus for a vending machine, comprising: a housing having a downwardly directed recess provided with a bottom wall portion, said bottom wall portion including a dispensing aperture adapted to be in effective communication with a dispensing outlet means of a conventional merchandise vending machine, dispensing means located in said recess in rotatably mounted relationship with respect to said bottom wall portion, said dispensing means having a plurality of substantially vertically directed dispensing holes therein circularly spaced from each other and provided with intervening non-apertured portions, driving means for rotating said dispensing means to bring said dispensing holes into successive communication with said dispensing aperture, each of said dispensing holes being of an arcuate length slightly greater than the length of a merchandise article which is to be dispensed and less than the width of two such merchandise articles, each of said dispensing holes being of a vertical depth substantially greater than the length of a merchandise article which is to be dispensed, whereby to receive and vertically stack two such merchandise articles in vertically superimposed relationship with at least the lower one of said two such merchandise articles therein and with the upper one of said two such merchandise articles at least partially therein, said intervening non-apertured portions of said dispensing means being horizontally stepped and each having a front upper portion and a rear lower portion positioned immediately behind said front upper portion of said dispensing means and lying at a level substantially lower than said front upper portion of said dispensing means and defining a storage recess of a size capable of receiving one merchandise article thereon in a position forward of the upper one of two vertically stacked merchandise articles received within the corresponding dispensing hole positioned arcuately rearwardly adjacent thereto; spring-biased locking bar means normally spring-biased inwardly into a position extending into one of said dispensing holes where it is vertically superimposed over said dispensing aperture in said bottom wall portion for temporarily immobilizing and holding an upper one of two vertically stacked merchandise articles received within said dispensing hole while allowing the lower positioned merchandise article to be freely dispensed through the aligned lower positioned dispensing aperture; and arcuate length-modifying adapter attachment means cooperable for removable attachment with respect to said dispensing means and extending downwardly into corresponding ones of said plurality of dispensing holes for controllably modifying the arcuate length thereof for dispensing cooperation with a diferent size of merchandise article than that adapted to be dispensed by the machine prior to length modification of said dispensing holes by said arcuate length-modifying adapter attachment means.

3. Apparatus as defined in claim 1, including a non-jamming merchandise agitator and collector in effectively superimposed relationship with respect to said dispensing means and effectively rotatably movable therewith as a unit, said agitator and collector having a plurality of substantially vertically directed dispensing openings therein circularly spaced apart and provided with separating non-apertured portions, said plurality of vertically directed dispensing openings of said agitator and collector being in vertical communication with the corresponding vertically directed dispensing holes of said underlying dispensing means, said plurality of separating non-apertured portions of said agitator and collector being positioned in vertically overlying relationship with respect to the corresponding intervening portions of said underlying dispensing means, said separating non-apertured portions of said agitator and collector comprising effectively arcuately resiliently deflectable stirring members extending upwardly from said intervening non-apertured portions of said dispensing means for resiliently deflectable stirring contact of a plurality of overlying merchandise articles adapted to be carried within a merchandise receptacle adapted to be positioned thereover; each of said dispensing openings being of arcuate configuration and being substantially longer in an arcuate direction than the corresponding underlying dispensing hole of said underlying dispensing means and being positioned thereover with the rear edges thereof in substantial vertical alignment; and fastener means effectively fastening said agitator and collector means in said superimposed relationship over said dispensing means.

4. A non-jamming positive feeding action agitating and dispensing apparatus for a vending machine, comprising: a housing having a downwardly directed recess provided with a bottom wall portion, said bottom wall portion including a dispensing aperture adapted to be in effective communication with a dispensing outlet means of a conventional merchandise vending machine, dispensing means located in said recess in rotatably mounted relationship with respect to said bottom wall portion, said dispensing means having a plurality of substantially vertically directed dispensing holes therein circularly spaced from each other and provided with intervening non-apertured portions, driving means for rotating said dispensing means to bring said dispensing holes into successive communication with said dispensing aperture, each of said dispensing holes being of an arcuate length slightly greater than the length of a merchandise article which is to be dispensed and less than the width of two such merchandise articles, each of said dispensing holes being of a vertical depth substantially greater than the length of a merchandise article which is to be dispensed, whereby to receive and vertically stack two such merchandise articles in vertically superimposed relationship with at least the lower one of said two such merchandise articles therein and with the upper one of said two such merchandise articles at least partially therein, said intervening non-apertured portions of said dispensing means being horizontally stepped and each having a front upper portion and a rear lower portion positioned immediately behind said front upper portion of said dispensing means and lying at a level substantially lower than said front upper portion of said dispensing means and defining a storage recess of a size capable of receiving one merchandise article thereon in a position forward of the upper one of two vertically stacked merchandise articles received within the corresponding dispensing hole positioned arcuately rearwardly adjacent thereto; a non-jamming merchandise agitator and collector in effectively superimposed relationship with respect to said dispensing means and effectively rotatably movable therewith as a unit, said agitator and collector having a plurality of substantially vertically directed dispensing openings therein circularly spaced apart and provided with separating non-apertured portions, said plurality of vertically directed dispensing openings of said agitator and collector being in vertical communication with the corresponding vertically directed dispensing holes of said underlying dispensing means, said plurality of separating non-apertured portions of said agitator and collector being positioned in vertically overlying relationship with respect to the corresponding intervening portions of said underlying dispensing means, said separating non-apertured portions of said agitator and collector comprising effectively arcuately resiliently deflectable stirring members extending upwardly from said intervening non-apertured portions of said dispensing means for resiliently deflectable stirring contact of a plurality of overlying merchandise articles adapted to be carried within a merchandise receptacle adapted to be positioned thereover; and spring-biased locking bar means normally spring-biased inwardly into a position extending into one of said dispensing openings where it overlies the corresponding dispensing hole and is vertically superimposed in vertical alignment over said dispensing aperture in said bottom wall portion for temporarily immobilizing and holding an upper one of two vertically stacked merchandise articles received within the corresponding vertically aligned dispensing hole and overlying dispensing opening while allowing the lower positioned merchandise article to be freely dispensed through the aligned lower positioned dispensing hole and dispensing aperture, said locking bar means also extending forwardly into a position overlying the corresponding one of said intervening non-apertured portions of said dispensing means and being operable to arcuately rearwardly displace a third merchandise article received within said forward portion of said dispensing opening after two vertically stacked merchandise articles received within said vertically aligned dispensing hole and overlying dispensing opening have been sequentially dispensed through said dispensing aperture, whereby to positively feed said third, and previously forwardly received, merchandise article into said dispensing hole.

5. Apparatus as defined in claim 4, including arcuate length-modifying adapter attachment means cooperable for removable attachment with respect to said intervening non-apertured portions of said dispensing means and extending downwardly along front edge portions thereof into corresponding ones of said plurality of dispensing holes for controllably modifying the arcuate length thereof for dispensing cooperation with a smaller size of merchandise article than that adapted to be dispensed by the machine prior to length modification of said dispensing holes by said arcuate length-modifying adapter attachment means.

6. Apparatus as defined in claim 4, wherein said agitator and collector is made of resilient elastically deflectable material to further enhance the non-jamming characteristics thereof.

7. Apparatus as defined in claim 4, wherein said agitator and collector and said dispensing means are made of resilient elastically deflectable material to further enhance the non-jamming characteristics thereof.

References Cited
UNITED STATES PATENTS

| | | | |
|---|---|---|---|
| 682,178 | 9/1901 | Dooley | 221—265 X |
| 2,054,552 | 9/1936 | Wakeham | 221—265 |
| 2,553,095 | 5/1951 | Jones | 221—265 |
| 2,684,784 | 7/1954 | Lime et al. | 221—203 |
| 2,990,975 | 7/1961 | Sereno | 221—265 X |
| 3,128,011 | 4/1964 | Bleiman | 221—287 X |
| 3,198,402 | 8/1965 | Hunt et al. | 221—265 X |

FOREIGN PATENTS 628,756  11/1961  Italy.

SAMUEL F. COLEMAN, *Primary Examiner.*